United States Patent
Hsiao et al.

(10) Patent No.: US 11,855,669 B2
(45) Date of Patent: Dec. 26, 2023

(54) METHOD FOR CANCELLING RADIO FREQUENCY INTERFERENCE AND COMMUNICATION SYSTEM THEREOF

(71) Applicant: REALTEK SEMICONDUCTOR CORP., Hsinchu (TW)

(72) Inventors: Po-Hsiu Hsiao, Hsinchu (TW); Liang-Wei Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/828,544

(22) Filed: May 31, 2022

(65) Prior Publication Data

US 2022/0393712 A1 Dec. 8, 2022

(30) Foreign Application Priority Data

Jun. 3, 2021 (TW) .................................. 110120114

(51) Int. Cl.
*H04B 1/10* (2006.01)
*H04B 1/04* (2006.01)

(52) U.S. Cl.
CPC ......... *H04B 1/1036* (2013.01); *H04B 1/0475* (2013.01); *H04B 2001/1063* (2013.01)

(58) Field of Classification Search
CPC ................ H04B 1/1036; H04B 1/0475; H04B 2001/1063
USPC ........ 375/219, 232, 227, 235, 346, 349, 350
See application file for complete search history.

(56) References Cited

U.S. PATENT DOCUMENTS

| 7,542,531 | B2 | 6/2009 | Lin et al. |
| 7,809,076 | B1 * | 10/2010 | Ghobrial ........... H04L 25/03885 |
| | | | 375/296 |
| 8,605,837 | B2 * | 12/2013 | Wiese .................. H04L 25/022 |
| | | | 375/232 |
| 8,625,704 | B1 * | 1/2014 | Sedarat .................... H04B 3/32 |
| | | | 375/295 |
| 8,861,663 | B1 | 10/2014 | Sedarat et al. |
| 2001/0050987 | A1 * | 12/2001 | Yeap .................... G10L 21/0208 |
| | | | 379/399.01 |

(Continued)

FOREIGN PATENT DOCUMENTS

EP 2151063 B1 * 12/2016 .......... H04J 11/0066
TW 200642379 A 12/2006

*Primary Examiner* — Emmanuel Bayard
(74) *Attorney, Agent, or Firm* — Li & Cai Intellectual Property (USA) Office

(57) ABSTRACT

A method for cancelling radio frequency interference (RFI) and a communication system thereof are provided. In the communication system, digital signals of a frequency domain are converted from analog signals and received by the communication system generally carry RFI, and the signals are processed by an equalizer and a far-end crosstalk canceller. Then, for preventing erroneous signals from forming due to an occurrence of a notch, masking parameters applied to the equalizer and the far-end crosstalk canceller are modified for not processing frequency bands that are RFI-affected. The frequency bands can be ignored by masking corresponding bins in the frequency domain after a fast Fourier transformation. The signals processed by the equalizer and the far-end crosstalk canceller are then outputted to an RFI canceller, and the signals with RFI cancellation can be obtained.

10 Claims, 7 Drawing Sheets

(56) References Cited

U.S. PATENT DOCUMENTS

| | | | | |
|---|---|---|---|---|
| 2005/0074079 A1* | 4/2005 | Jin | ................ | H04L 27/2647 |
| | | | | 455/296 |
| 2006/0182014 A1* | 8/2006 | Lusky | ................ | H04B 3/23 |
| | | | | 370/252 |
| 2007/0237270 A1* | 10/2007 | Mezer | ............... | H04L 25/03878 |
| | | | | 375/346 |
| 2011/0103459 A1* | 5/2011 | Esmailian | ......... | H04L 25/03057 |
| | | | | 375/233 |
| 2013/0308695 A1* | 11/2013 | Kota | ................ | H04L 27/01 |
| | | | | 375/235 |
| 2015/0011172 A1* | 1/2015 | Reinhardt | ............ | H04B 1/1027 |
| | | | | 455/296 |

\* cited by examiner

METHOD FOR CANCELLING RADIO FREQUENCY INTERFERENCE AND COMMUNICATION SYSTEM THEREOF

CROSS-REFERENCE TO RELATED PATENT APPLICATION

This application claims the benefit of priority to Taiwan Patent Application No. 110120114, filed on Jun. 3, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is generally related to a technology of signal interference cancellation, and more particularly to a method for cancelling radio frequency interference for preventing notch by masking the frequency bands suffering from radio-frequency interference, and a communication system thereof.

BACKGROUND OF THE DISCLOSURE

A wireless communication system may encounter various interferences during operation. An equalizer is an important component in the wireless communication system. A process of transmitting wireless signals to a receiver over a transmission path may be interfered by multipath interferences and a shadow effect caused by an obstruction which blocks the transmission path, such that an error rate of received signals may be increased. Therefore, in order to reduce the error rate, a channel estimation is performed in the conventional wireless communication system, and the equalizer is used for channel compensation according to an estimation result.

Radio-frequency interference (RFI) is a specific type of interference for the wireless communication system. One of the causes for the RFI is an electromagnetic radiation since it resonates with the radio frequency in the same frequency band so that the radio wave cannot be transmitted. The RFI is essentially caused by a high-speed transmission conducted via a wired high-frequency interface. Both baseband frequency and frequency multiplication are high frequency signals that may overlap with the radio frequency signals so as to generate the electromagnetic radiation that forms noises due to the high frequency signals being discontinuous. Since the power of the radiation noises is much higher than the radio signals, a resonance between the high frequency noises and the radio signals results in interference such as the RFI.

A conventional RFI canceller has been developed. In a communication system, a tone generator is adopted behind an equalizer for cancelling RFI. However, the RFI canceller easily interacts with the equalizer and a filtering circuit such as a far-end crosstalk canceller (FEXT canceller) under a training mode at a connection phase. The performance of the communication system may be affected and the connection may fail in severe cases due to the coefficients of the communication system being distorted.

SUMMARY OF THE DISCLOSURE

For preventing problems resulting from an over-treatment process being performed on filtering circuits under mutual electromagnetic interference in a communication system, a method and a communication system operating the method are provided in the present disclosure for cancelling radio frequency interference (RFI). In the method, a notch that is formed due to over-treatment by an interference-cancellation circuit of the communication system can be avoided by masking RFI-affected frequency bands.

In an aspect of the communication system of the present disclosure, the main circuits of the communication system include an analog-digital signals converter used to convert analog signals received by the communication system into digital signals in a frequency domain, an RFI detector used to detect the RFI-affected frequency bands in the digital signals, an interference-cancellation circuit, such as an equalizer and a far-end crosstalk canceller, used to cancel interference in the communication system, and an RFI canceller used to perform RFI cancellation on the digital signals with the RFI-affected frequency bands.

The communication system performs the method for cancelling radio frequency interference, in which the RFI detector detects the RFI-affected frequency bands in the digital signals, and a processing circuit modifies the masking parameters of the interference-cancellation circuit. After modification, the masking parameters allow the RFI-affected frequency bands of the digital signals to be not processed by the interference-cancellation circuit. Afterwards, the digital signals processed are transmitted to the RFI canceller that performs radio-frequency interference cancellation. The digital signals with radio-frequency interference cancellation are then outputted.

In the communication system, the digital signals with radio-frequency interference cancellation are further processed by a data slicer, and signals that are not noises are outputted from the communication system.

Further, the digital signals processed by the data slicer are processed by a feedback equalizer for cancelling the inter-symbol interference and the inter-carrier interferences so as to increase a signal-to-noise ratio. Afterwards, the digital signals processed by both the data slicer and the feedback equalizer are fed back to the RFI canceller for optimizing the performance of the RFI canceller.

In one further aspect of the present disclosure, the interference-cancellation circuit includes an equalizer and a far-end crosstalk canceller. The digital signals are processed by the interference-cancellation circuit by modifying the masking parameters of the equalizer and the far-end crosstalk canceller. After modification, the masking parameters allow the RFI-affected frequency bands of the digital signals to be not processed by the equalizer and the far-end crosstalk canceller.

In another aspect of the present disclosure, the step in which the one or more RFI-affected frequency bands are not processed is to mask bins that experience radio-frequency interference after the signals in the time domain are transformed to the frequency domain by fast Fourier transformation.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
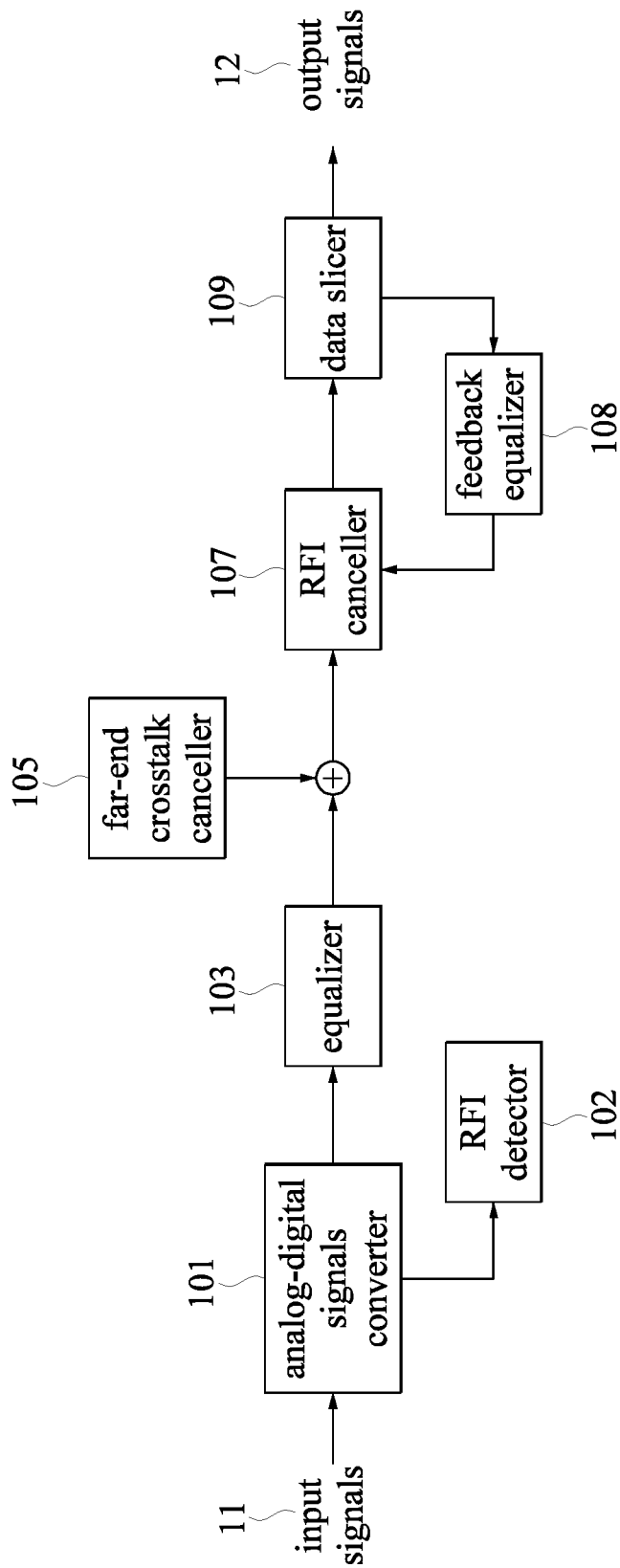
FIG. 1 is a schematic diagram depicting a circuit framework of a communication system that operates a method for cancelling radio frequency interference according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the field of wireless communication, both a transmitter and a receiver may suffer from signal interference such as radio-frequency interference (RFI). The radio-frequency interference is a type of electromagnetic interference (EMI) that is generally caused by mutual inductance coupling between signals with close frequency bands or similar positions in a frequency spectrum. The radio-frequency interference may occupy unoccupied frequency bands or cause interference to signals of the frequency bands in use. The conventional technology of radio-frequency interference cancellation can only reduce the interference and cannot completely eliminate the interference. Therefore, in addition to isolating the interference source as much as possible, ways of compensation and gain adjustment can also be used. In the communication system, a specific interference-cancellation circuit such as an equalizer or a far-end crosstalk canceller may form a notch due to over-treatment of the interference, and the notch affects the radio-frequency interference cancellation effect.

The present disclosure is related to a method for cancelling radio frequency interference, and a communication system thereof. One of the objectives of the method is to modify the masking parameters of an equalizer and a far-end crosstalk canceller of the communication system for not processing the RFI-affected frequency bands of the signals when performing RFI cancellation. After that, the signals are provided to an RFI canceller for RFI cancellation. Accordingly, the notch that may affect the effect of radio-frequency interference cancellation and formed from the RFI canceller interacting with the equalizer or the far-end crosstalk canceller can be avoided. Therefore, the performance of the communication system can be maintained since the error caused by the notch when the signals are processed can be avoided.

Figure 2:
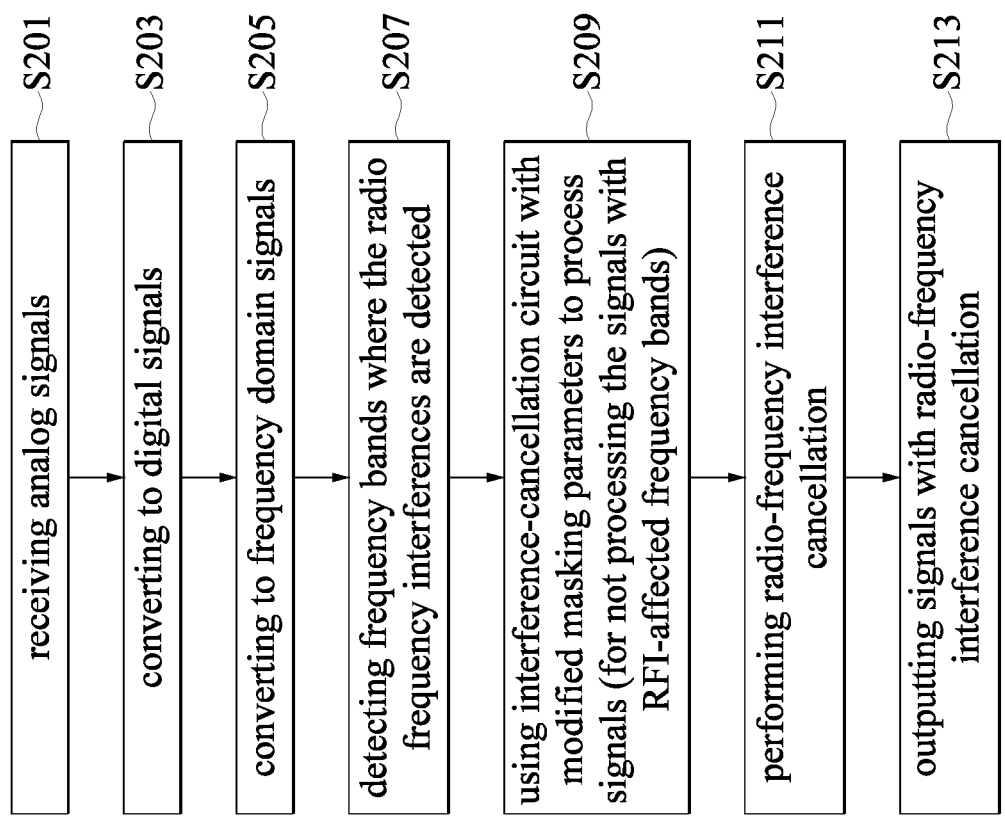
FIG. 2 is a flowchart describing the method for cancelling radio frequency interference according to one embodiment of the present disclosure.

Reference is made to FIG. 1, which depicts a circuit framework of the communication system that operates the method for cancelling radio frequency interference according to one embodiment of the present disclosure. The circuit framework shows the circuitry components of the communication system used to implement the process as shown in the flow chart of FIG. 2.

In step S201, the communication system receives input signals 11 via an antenna. The received analog input signals are converted into digital signals by an analog-digital signals converter 101, such as in step S203. In step S205, signals in a time domain are then converted into signals in a frequency domain. Next, such as in step S207, an RFI detector 102 is used to detect the frequency bands that experience radio-frequency interference (i.e., RFI-affected frequency bands) in the digital signals. According to one embodiment of the present disclosure, one of the approaches to detect the RFI-affected frequency bands in the digital signals is to store the digital signals to a buffer of the communication system to transform the signals in the time domain to the frequency domain via a fast Fourier transformation, and then to distinguish the signals with radio-frequency interference from rest of the signals based on features of interfered signals by the RFI detector 102 of the communication system.

To the RFI-affected frequency bands detected by the RFI detector 102, the communication system masks these RFI-affected frequency bands so as to not process the RFI-affected frequency bands of the digital signals in the following process of interference cancellation performed by an interference-cancellation circuit. A bin is the smallest unit for the Fourier transformation and the bin can be used to represent the frequency band to be masked. The step of not processing the one or more RFI-affected frequency bands is to mask the bins that experience radio-frequency interference after the signals in the time domain are transformed to the frequency domain by fast Fourier transformation. The calculation for modifying the masking parameters can be referred to in the following equations.

Equation 1 incorporates a least mean square (LMS) manner to update coefficients of an equalizer (e.g., a feed-forward equalizer (FFE)) 103 and a far-end crosstalk (FEXT) canceller 105 of the communication system in a frequency domain. "C(k)" in equation 1 represents a bin in the frequency domain; "k" is an index value; "μ*$X^H$(k)E(k)" represents coefficients that are applied to the interference-cancellation circuits such as the equalizer 103 and the far-end crosstalk canceller 105 for performing interference cancellation. Equation 2 is a Fourier transformation equation used in the communication system.

In the method for cancelling radio frequency interference, gradients mapped to the bins that are RFI-affected in the frequency domain are configured to be masked. In other words, when the RFI detector detects radio-frequency interference in any bin with index "m", the related masking parameter of the bin is marked with "0." As shown in equation 3, if the signals with index "k" are one-by-one processed to the bins (with index k=m) which are detected to be with the radio-frequency interference, the coefficients for interference cancellation (($X^H$(k)E(k)) are set to be 0. The bins masked with the coefficients that are set to 0 are not updated, such that the equalizer 103 and the far-end crosstalk canceller 105 do not process the frequency bands that experience the radio-frequency interference.

$$C(k+1)=C(k)+\mu*X^H(k)E(k); E(k)=FFT[e(n)] \quad \text{(Equation 1)}$$

$$X(k)=FFT[X(n)], k=1,2,\ldots,N \quad \text{(Equation 2)}$$

$$X^H(k)E(k)=0, \text{ if } k=m \quad \text{(Equation 3)}$$

Accordingly, the interference-cancellation circuit with the modified masking parameters processes the signals (step S209). In particular, the frequency bands that are affected by the radio-frequency interference are not processed. Next, in one aspect of the present disclosure, the RFI detector 102 can detect and provide the frequency bands or the bins that are affected by radio-frequency interference to an RFI canceller 107 for performing an RFI cancellation on the RFI-affected frequency bands or the bins (step S211). The signals with RFI cancellation are outputted (step S213).

In one embodiment of the present disclosure, in a communication system, the digital signals that are processed by RFI cancellation are outputted and then processed by a data slicer 109. Output signals 12 that are not noises are then outputted from the communication system. The data slicer 109 is one of the post-processing circuits of the communication system for implementing post amplification. Therefore, the data slicer 109 allows the communication system to amplify output amplitude of the signals to a level for demodulation. The data slicer 109 can use a comparator to obtain an error according to bit symbols in the signals so as to recover the digital signals demodulated by a receiver of the communication system. Finally, the signals can be determined as the noises or the actual signals that are configured to be outputted.

When the data slicer 109 outputs signals, the signals are transmitted to a feedback equalizer (FBE) 108 configured to eliminate the inter-symbol interference and the inter-carrier interference in the signals, so as to increase a signal-to-noise ratio.

In one embodiment of the present disclosure, the communication system can be implemented by a circuit system. The communication system can be applied to a network device for processing network signals. When the network device receives signals, a circuit of the network device transforms the signals in the time domain to the frequency domain. The signals may carry radio-frequency interference (RFI). As shown in the above embodiments, the multipath interference in the signals can be processed by the equalizer.

After the far-end crosstalk canceller processes crosstalk in the signals, the signals are then transmitted to the RFI canceller. Finally, the signals being processed by the data slicer are outputted.

Figure 3:
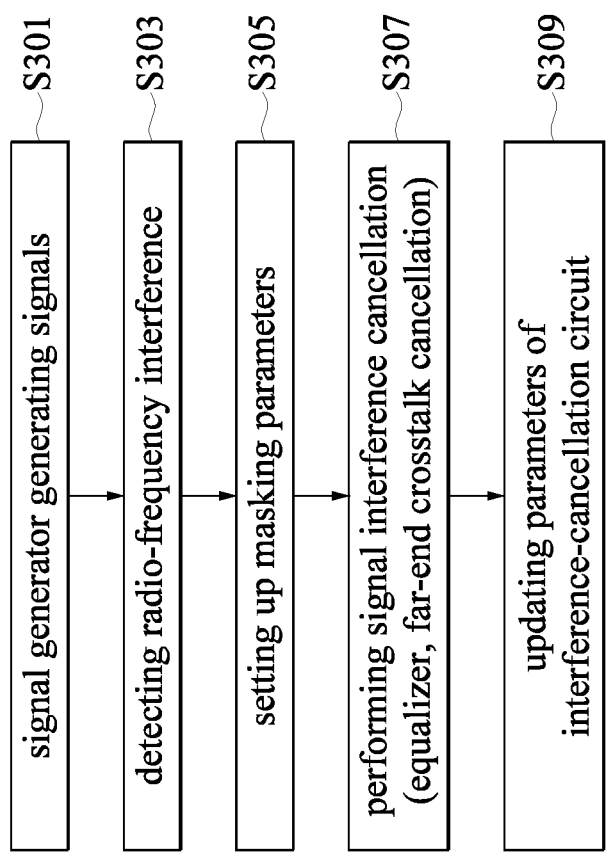
FIG. 3 is a flowchart describing a process for obtaining masking parameters of an interference-cancellation circuit of the communication system by convergence under a training mode according to one embodiment of the present disclosure.

The communication system applies the above-described method for cancelling radio frequency interference, and FIG. 3 shows a flow chart describing the steps for converging and obtaining the masking parameters for the interference-cancellation circuit of the communication system under a training mode according to one embodiment of the present disclosure.

The communication system uses a signal generator to generate signals under the training mode (step S301). The RFI detector can detect the radio-frequency interference according to features of the interference (step S303). The frequency bands or bins that are affected by the interference are marked. The marks are stored in the buffer of the communication system. Masking parameters are then set up for the marked frequency bands or bins (step S305). The masking parameters allow the RFI-affected frequency bands of the digital signals to be not processed by the equalizer and the far-end crosstalk canceller (step S307). A result of signal interference cancellation can be obtained, and the parameters applied to the interference-cancellation circuit can be accordingly updated (step S309).

The parameters applied to the interference-cancellation circuit are updated and can be referred to in the waveform diagrams shown in FIG. 4 to FIG. 7.

Figure 4:
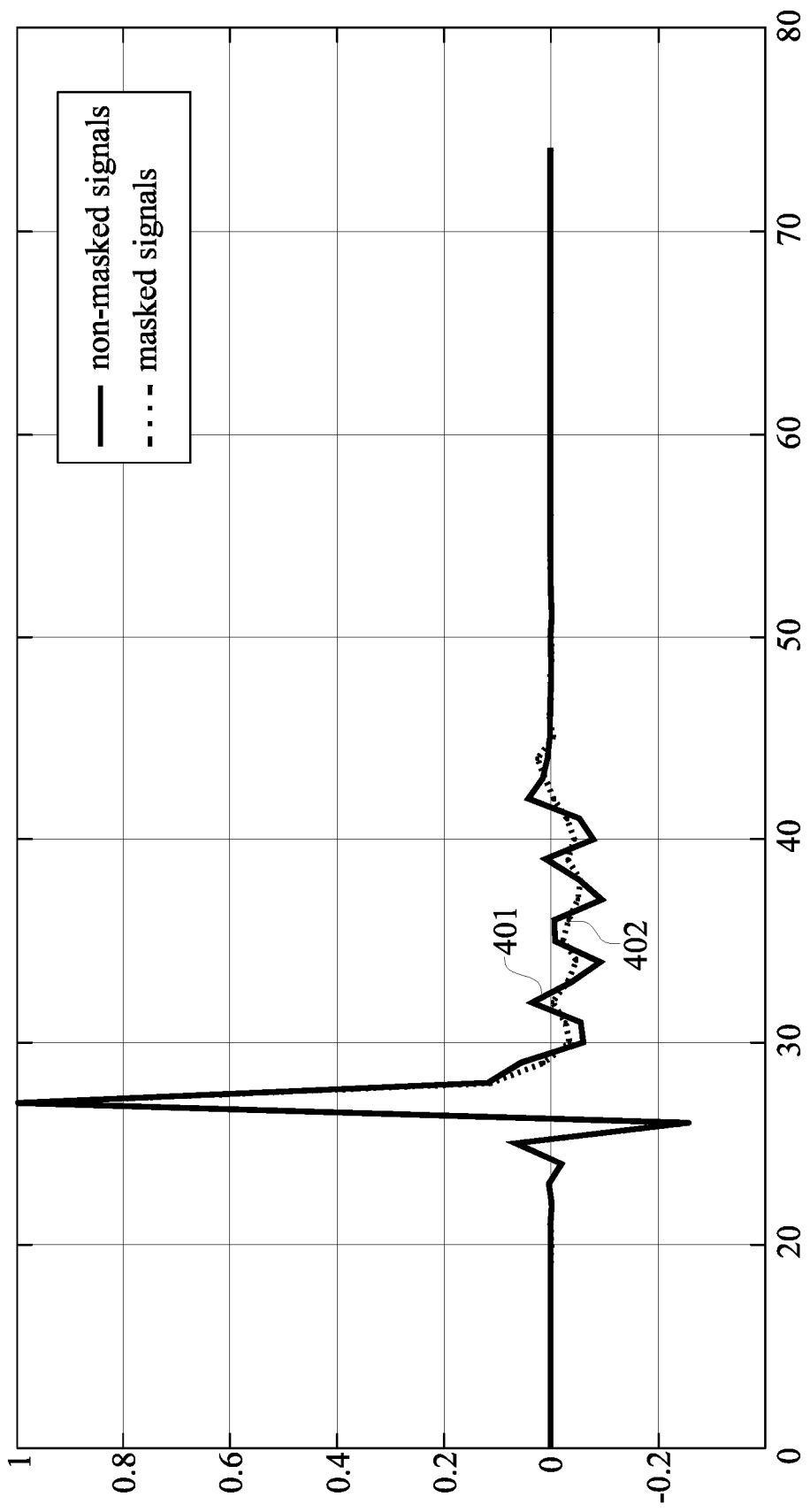
FIG. 4 is a waveform diagram of signals processed by a feed-forward equalizer in a time domain in one example of the present disclosure.
Figure 5:
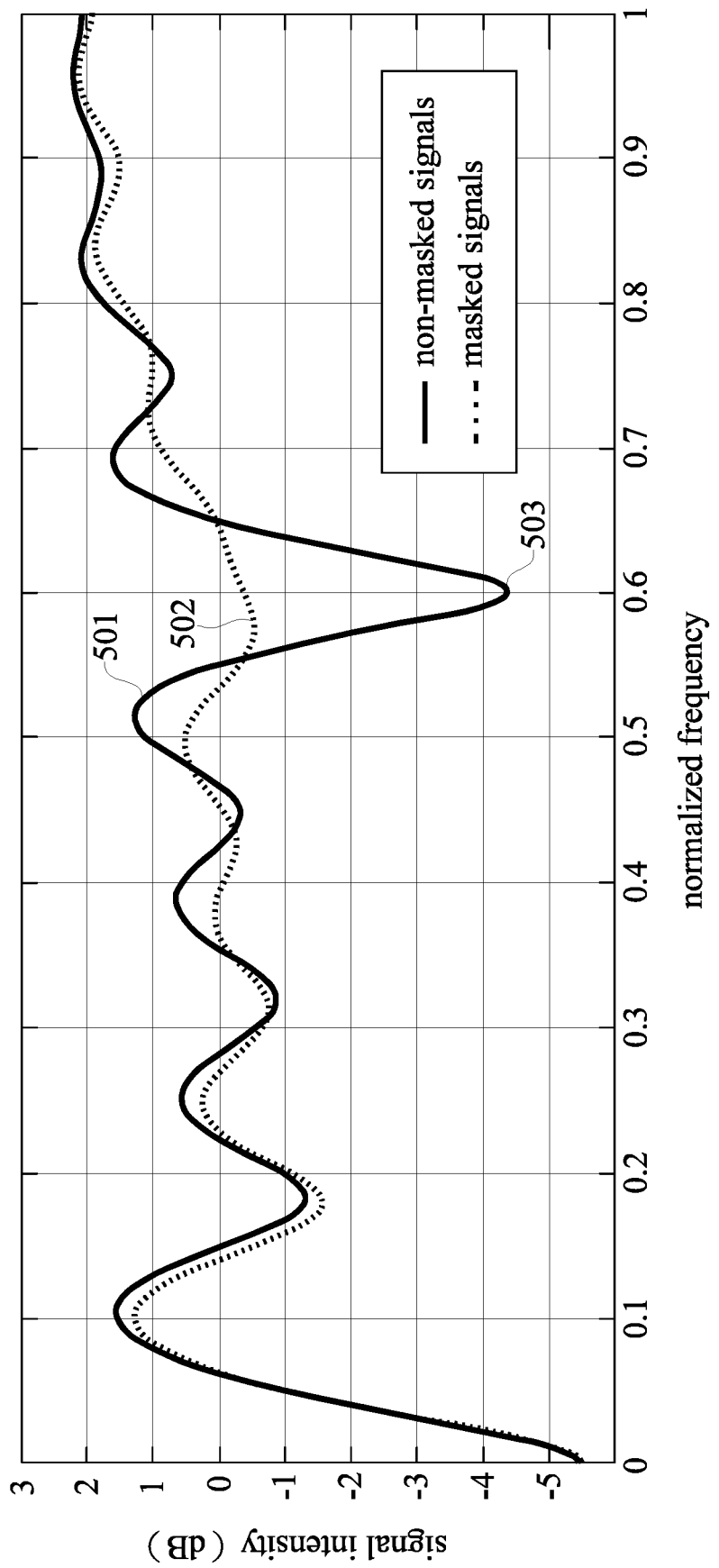
FIG. 5 is a waveform diagram of the signals processed by the feed-forward equalizer in a frequency domain in one example of the present disclosure.

FIG. 4 shows a waveform diagram of signals processed by a feed-forward equalizer in a time domain. In the waveform diagram, when the signals are processed by the equalizer, the non-masked signals 401 without undergoing masking process are obtained if the frequency bands with the radio-frequency interference are not masked. Once the frequency bands with the radio-frequency interference are masked, the masked signals 402 that undergone the masking process are obtained. As shown in the diagram, when the signals are processed by the equalizer, the portion with masked signals 402 is flattened and the peak portion is not affected.

The signals in the time domain are converted into signals in the frequency domain. The performance of equalizer can be referred to in FIG. 5, which shows a waveform diagram when the feed-forward equalizer is in operation under the frequency domain. After the equalizer processes the signals, non-masked signals 501 are obtained when the RFI-affected frequency bands are not masked. As shown in the waveform diagram, the waveform depicting the signal intensity of the non-masked signals 501 has an obvious depression around a position of "0.6." According to the abovementioned embodiment, a notch 503 may be formed due to over-treatment when the signals are processed. However, when the frequency bands to be detected with the radio-frequency interference are masked, the masked signals 502 that have solved issues regarding the notch 503 can be obtained after the equalizer processes the signals.

Figure 6:
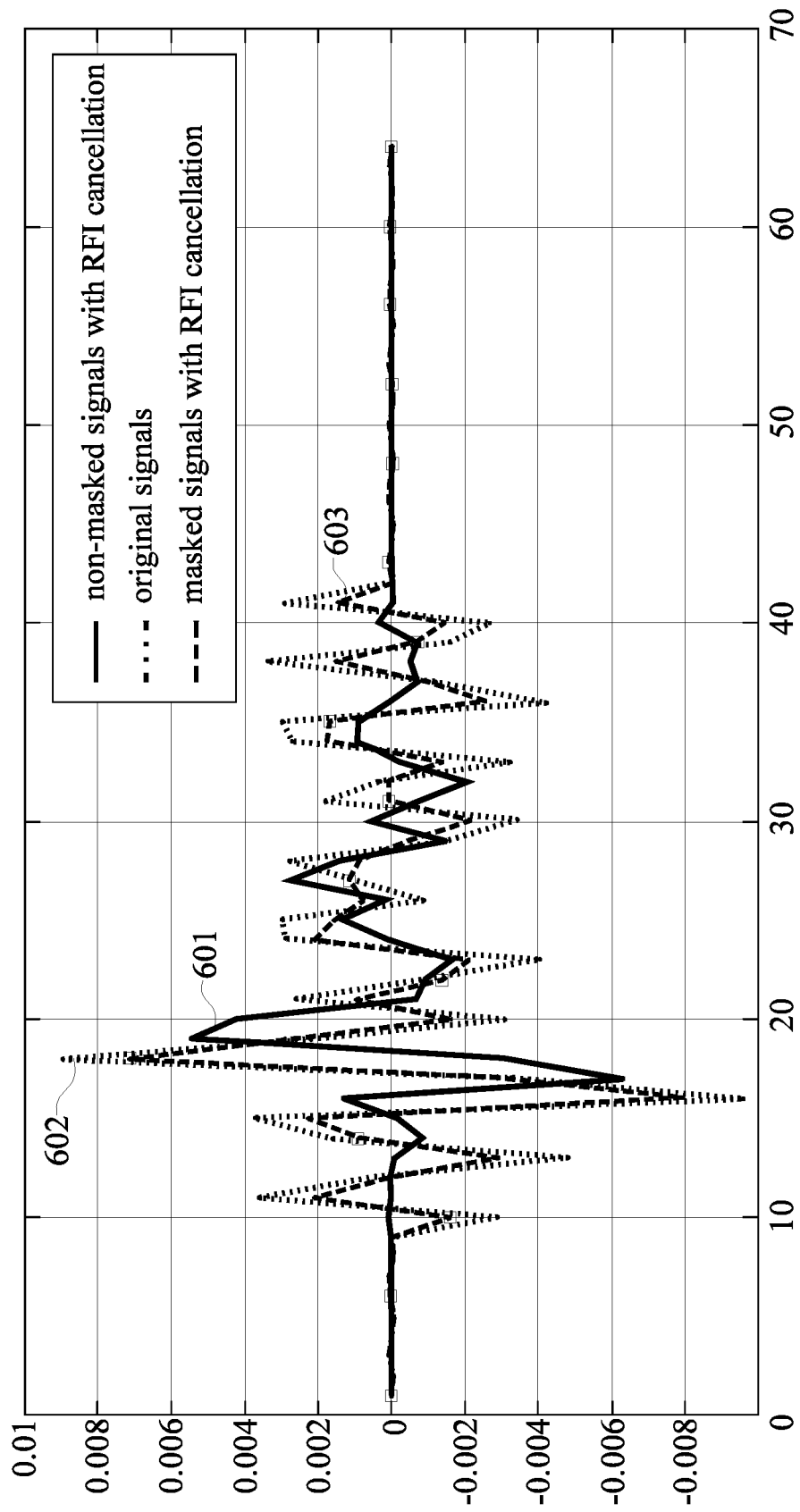
FIG. 6 is a waveform diagram of signals processed by a far-end crosstalk canceller in the time domain in one example of the present disclosure.

Reference is made to FIG. 6, which is a waveform diagram that depicts the far-end crosstalk canceller processing the signals in the time domain. In the diagram, the waveform of original signals 602 is shown to exhibit a large oscillation. If the RFI-affected frequency bands of the original signals 602 are not masked, the non-masked signals 601 with interference cancellation are obtained after the far-end crosstalk canceller processes the signals. If the RFI-affected frequency bands are masked, the masked signals 603 with interference cancellation are obtained after the far-end crosstalk canceller processes the signals. Therefore, in this time domain, no obvious effect is obtained by masking the RFI-affected frequency bands.

Figure 7:
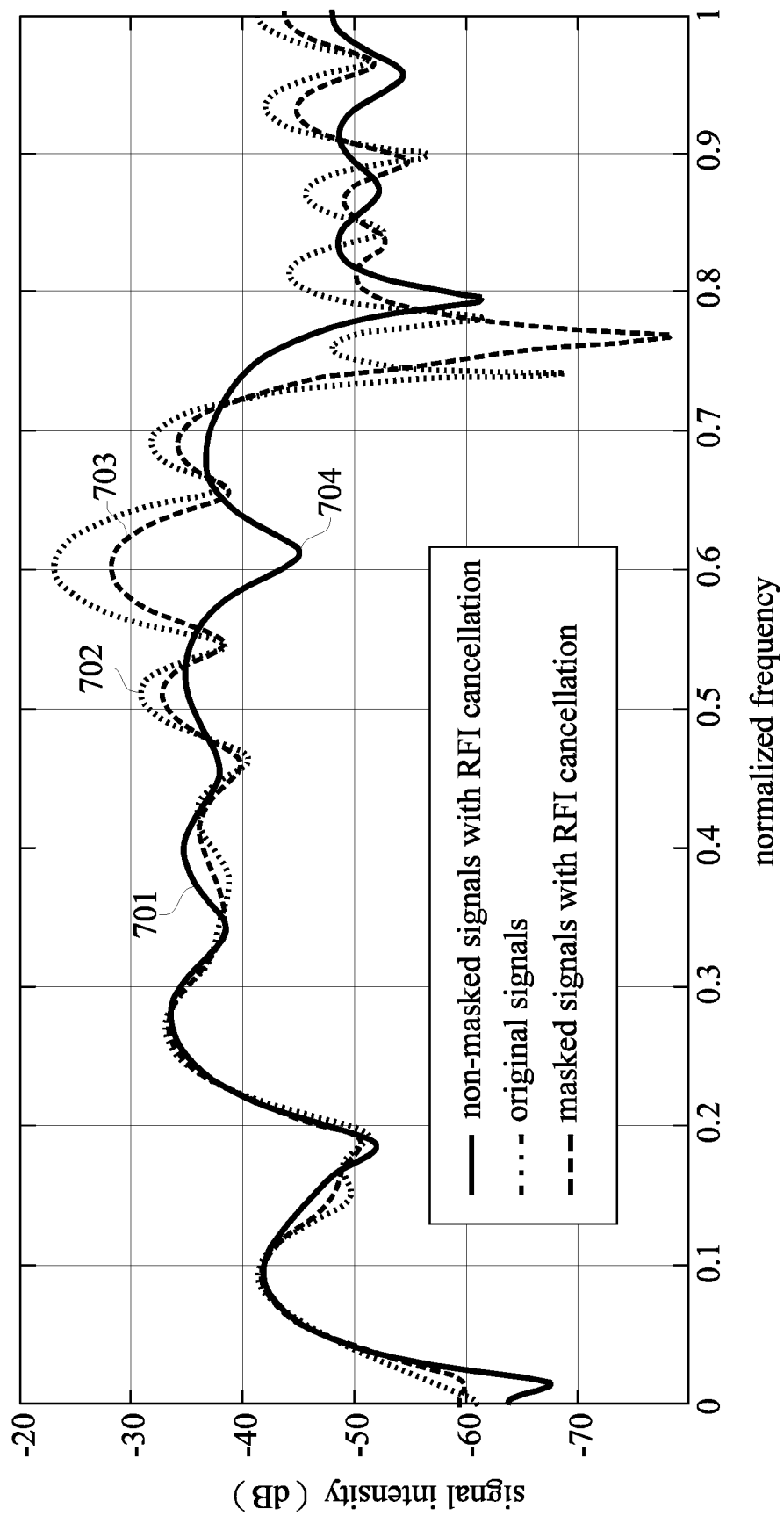
FIG. 7 is a waveform diagram of the signals processed by the far-end crosstalk canceller in the frequency domain in one example of the present disclosure.

When the signals in the time domain are converted into the signals in the frequency domain, the waveform obtained when the far-end crosstalk canceller processes the signals can be referred to in waveform diagram in the frequency domain shown in FIG. 7.

The waveform diagram of FIG. 7 shows original signals 702 as an example, the RFI-affected frequency bands of the original signals 702 are not masked, and non-masked signals 701 with interference cancellation are obtained after the far-end crosstalk canceller processes the signals. At this time, a notch 704 is formed in the waveform due to over-treatment. However, if the RFI-affected frequency bands in the signals are masked, the masked signals 703 with interference cancellation can be obtained since the notch 704 has been solved. Accordingly, the method for cancelling radio frequency interference of the present disclosure is able to effectively reduce notch caused by the RFI-affected equalizer and far-end crosstalk canceller. In other words, the method of the present disclosure effectively reduces the impact of radio-frequency interference on the filters, such as the interference-cancellation circuit in the communication system. Therefore, stability of the performance of the communication system can be maintained.

In summation, according to abovementioned embodiments which describe the method for cancelling radio frequency interference and the communication system for cancelling radio frequency interference of the present disclosure, the method essentially solves the problem that the interference-cancellation circuit of the communication system may generate errors due to over-treatment. Specifically, when the RFI-affected signals are received by the communication system, for avoiding the problem that the notch causes erroneous signals, the method modifies the masking parameters applied to the equalizer and the far-end crosstalk canceller for not processing the RFI-affected frequency bands in the signals. Afterwards, the RFI canceller is configured to cancel the radio-frequency interference, and finally the communication system obtains the digital signals with interference cancellation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for cancelling radio frequency interference (RFI), operated in a communication system, comprising:
   converting received analog signals into digital signals in a frequency domain;
   detecting, by an RFI detector, one or more RFI-affected frequency bands of the digital signals;
   processing the digital signals by, an interference-cancellation circuit, with modified masking parameters of an equalizer and a far-end crosstalk canceller of the interference-cancellation circuit that does not process the RFI-affected frequency bands of the digital signals by modifying original masking parameters applied to the equalizer and the far-end crosstalk canceller;
   performing RFI cancellation by an RFI canceller; and
   outputting the digital signals with RFI cancellation.

2. The method according to claim 1, wherein the RFI detector provides the one or more RFI-affected frequency bands to the RFI canceller for performing RFI cancellation.

3. The method according to claim 1, wherein the step in which the one or more RFI-affected frequency bands are not processed is to mask bins that are RFI-affected after the signals in the time domain are transformed to the frequency domain by fast Fourier transformation.

4. The method according to claim 1, wherein the digital signals with RFI cancellation are further processed by a data slicer, and wherein signals that are not noises are outputted from the communication system.

5. The method according to claim 4, wherein the digital signals processed by the data slicer are also processed by a feedback equalizer for cancelling inter-symbol interference and inter-carrier interference so as to increase a signal-to-noise ratio, and then fed back to the RFI canceller.

6. A communication system, comprising:
   an analog-digital signal converter used to convert analog signals received by the communication system into digital signals in a frequency domain;
   an RFI detector used to detect RFI-affected frequency bands of the digital signals;
   an interference-cancellation circuit used to perform interference cancellation; and
   an RFI canceller used to perform RFI cancellation to the RFI-affected frequency bands of the digital signals;
   wherein the communication system performs a method for cancelling RFI comprising:
     detecting, by the RFI detector, one or more RFI-affected frequency bands of the digital signals by the RFI detector;
     processing the digital signals, by the interference-cancellation circuit with modified masking parameters of an equalizer and a far-end crosstalk canceller of the interference-cancellation circuit that does not process the RFI-affected frequency bands of the digital signals by modifying original masking parameters applied to the equalizer and the far-end crosstalk canceller;
     performing RFI cancellation by the RFI canceller; and
     outputting the digital signals with RFI cancellation.

7. The communication system according to claim 6, wherein the RFI detector provides the one or more RFI-affected frequency bands to the RFI canceller for performing RFI cancellation.

8. The communication system according to claim 6, wherein the step in which the one or more RFI-affected frequency bands are not processed is to mask bins that experience RFI after the signals in the time domain are transformed to the frequency domain by fast Fourier transformation.

9. The communication system according to claim 6, wherein the digital signals with RFI cancellation are further processed by a data slicer, and wherein signals that are not noises are outputted from the communication system.

10. The communication system according to claim 9, wherein the digital signals processed by the data slicer are also processed by a feedback equalizer for cancelling inter-symbol interference and inter-carrier interference so as to increase a signal-to-noise ratio, and then fed back to the RFI canceller.

* * * * *